UNITED STATES PATENT OFFICE 2,545,323

METHOD OF CASTING OBJECTS FROM MAGNESIA CEMENTS

Jean Francois Marie Verdier Dufour, Paris, France

No Drawing. Application August 31, 1949, Serial No. 113,489. In France May 19, 1948

3 Claims. (Cl. 25—155)

It is well known that magnesia cements, prepared from calcined magnesia mixed eventually with mineralized or other fillers and with a solution of magnesium salts, for example magnesium chloride or sulphate, yield very hard superficially bright castings of considerable mechanical strength. However, the diffusion of these products, namely by way of casting, and their industrial utilization are almost insignificant on account of difficulty and time involved in carrying out casting operation. The latter consists generally in feeding a more or less liquid pasty mass into a suitable mold from which, however, the casting may be removed only when the chemical reaction, causing the setting, is sufficiently advanced to render the casting sufficiently cohesive to permit its discharge from the mold; this requires a time varying according to the kinds of magnesia employed, its temperature and time of calcination—elements generally unknown to the molder, fillers added according to both their natures and proportions, surrounding atmospheric conditions (temperatures, humidity, etc. . .). The time thus required is at least several hours if not several days. It results therefrom that the return of the molds is very slow and difficult to organize on account of a great number of variables influencing the time of stay in the molds and because of the uncertainty in which the molder finds himself as to the exact number of hours of this time of stay which, for a determined magnesia, with fillers well defined and taken in known proportions, and with a given degree of the solution, may vary from 12 to 72 hours, according to variations in the surrounding temperature between 0° and 30° C., and which is further influenced by other factors such as surrounding humidity, mass of castings etc. . .

On the other hand, the discharge or stripping of said magnesia products treated according to the existing methods is difficult on account of friction and suction effects that always act against an easy stripping which is rendered still more difficult by frequent adherences of the magnesia product to the mold body, adherences produced by multiple causes such as penetration of the magnesia mass or its liquid component by capillarity into a porous portion of the mold, or partial oxidation of the latter by oxychlorides or oxysulphates of magnesia, formed in the course of setting. This calls for molds of excessive capacity, hence sometimes complicated and difficult to make. On the other hand, superficial repairs on the castings are often necessary, after stripping, which enhance the cost of manpower and yet remain generally visible since magnesia cement after its setting has a color paler on its surface than within its mass, and this is all the more visible as the mass is more pigmented. The last mentioned shortcoming may be remedied by coating the surface of a cast magnesia object with a paint or a varnish, after the manner of plaster objects, but this annihilates the aspect superiority of the magnesia cements over the plaster which, at present, is less costly, more expeditious and easier to cast.

Furthermore, the magnesia castings thus obtained are seldom stable, for they are subject to unforeseen flaws occurring therein even several months after being cast and finally causing the finished articles to crack or even burst into pieces.

In a more general way, the excess of magnesia salt solution added to obtain a fluidity sufficient for the purpose of casting, remains uncompounded and owing to its hygroscopicity either absorbs or liberates the humidity, giving rise to moist spots appearing surreptitiously on the cast articles several days after casting, or to whitish deposits irregularly altering the aspect of the articles.

The present invention has for its object to provide a simple method that permits of remedying these various shortcomings and, at the same time, lowering the prime cost of casting. This method consists substantially in subjecting a mixture of constituent elements of aforesaid magnesia cements (magnesia MgO, magnesia carbonate $MgO.CO_2$, or a mixture thereof, to which convenient fillers may be added, in a solution of a salt of magnesium such for example as magnesium chloride or sulphate) to a short-lasting pressure in a suitable mold, and immediately thereafter discharging from this mold the casting which, under the action of said pressure, has acquired a sufficient cohesion permitting the same to be discharged and manipulated; the chemical transformation, which has for its effect to harden the magnesia product, going on outside of the mold and ending in imparting to the casting the desired qualities inherent to the magnesia cements. The time of this hardening is in the same order of magnitude as in the usual methods, but since this hardening takes place outside of the mold, the latter is not immobilized, while, on the other hand, the cohesion imparted to the casting by the pressure permits the same to be manipulated, conditioned, forwarded, etc. . ., only the actual use of the casting should be made after this attains its total hardness; the latter, however, is always obtained in a lapse of time practically shorter than that required according to the usual methods, account being taken of the time necessary for making the article and the time at which this article may be set in actual service.

The present method therefore permits, without any inconvenience, of rapidly discharging the casting from its mold within a predetermined and constant lapse of time for a given pressure, in a mechanical and really industrial way.

Furthermore, the castings made according to this method are always stable, whatever may be, both in proportion and in nature, the additional charges employed. The magnesia castings thus obtained are never subject to cracking, bursting, sweating, nor to superficial phenomena altering the aspect of castings, in contrast to the articles made from magnesia cements by means of heretofore known methods.

Pressures used in the present method may exceed, for example, 100 kg./cm.$^2$ during a lapse of time that may be inferior to 2 or 3 minutes approximately. This lapse of time may be made shorter by employing higher pressures: from 400 to 1200 kg./cm.$^2$; it will even suffice to apply an instantaneous pressure such as that obtained by means of high duty stamping or other presses. Thus, there may be obtained a succession of castings at the rate of say from 15 to 60 pieces per minute, while a succession of molds and discharges, as long as sufficient pressure is available, will be limited to equipment available for filling the molds.

The same principle permits of working up pastes obtained from the same elements, by causing them to pass through a suitable die after the manner used for coiling rubber containing materials.

Any molding methods may serve the purpose of the invention, in particular those used for molding thermo-hardening or thermo-plastic resins, or metals under pressure. The mold employed may be an open mold like one used for resins, or a chill mold like one used for metals, or else it may be composed of a stationary part having the profile of the piece to be executed and in which there are arranged two sliding pistons, one being a presser and the other an ejector, and whose active surfaces are exact negatives of each of the faces of the object to be made; it is then desirable to have the piston-ejector surface as large as possible. Single or multiple molds may be used, with or without pins and dowels.

The method of the invention is exemplified as follows:

A solution of chloride of magnesium is added to a calcined magnesia (MgO) powder, to which a filler may be added, and all is mixed carefully in a manner to obtain a homogeneous product. Preferably, this mixture should be prepared in advance, say from 12 to 48 hours, the more in advance the lower the surrounding temperature, though this is not indispensable. The mixture is then introduced into the mold or molds in which it is compressed say under effective pressure of 200 kg./cm.$^2$ for from 1 to 2 minutes, or for a shorter time under a higher pressure. At the end of this compression the casting or castings have a sufficient cohesion to permit them to be immediately discharged (either by opening the mold or by ejection, or in any other way) and manipulated, as may be desired, without their edges being damaged thereby since their compression in the mold has been sufficiently effective.

The invention permits, on one hand, of obtaining a return of the molds employed much more expeditious than that made possible by the existing methods of casting magnesia cements, and even more expeditious than that obtained in casting plastic materials such as synthetic resins, and, on the other hand, of avoiding the well known instability of magnesia cements, their aspect defects and want of regularity, while conserving all their advantages: mechanical, chemical and physical, for example their incombustibility. Moreover, the invention permits of considerably reducing the cost of production, as compared with existing methods.

The method of the invention may have applications to casting all sorts of objects, such as lining and decoration articles, statuettes, toys, funeral articles, publicity objects, household articles, covers, handles, parts of electrical and other industrial apparatus, etc., and in a general way a wide variety of articles having for their desired qualities a low cost of production, accurate dimensions and similarity, great superficial hardness, rigidity, incombustibility, imputrescibility.

What is claimed is:

1. The method of casting in moulds, articles of magnesia cement from calcined magnesia and a solution of a salt of magnesium, comprising mixing the components of said cement, placing said mixture into the mould, subjecting said mixture in its mould to a temporary pressure, discharging the casting from the mould as soon as said casting is sufficiently hard superficially to be manipulated and allowing the final hardening of said casting to occur after said discharge.

2. The method as claimed in claim 1 wherein the pressure is within the range from 100 kil./cm.$^2$ to 200 kil./cm.$^2$ and the duration of the pressure in the range from 3 to 1 minutes.

3. The method as claimed in claim 1 wherein the pressure is nearly 1200 kil./cm.$^2$ and the duration of said pressure only one moment.

JEAN FRANÇOIS MARIE
VERDIER DUFOUR.

REFERENCES CITED

The following references are of record in the file of this patent:

UNITED STATES PATENTS

| Number | Name | Date |
|---|---|---|
| 1,572,714 | Frosell | Feb. 9, 1926 |